United States Patent
Rath

(10) Patent No.: US 11,881,575 B2
(45) Date of Patent: Jan. 23, 2024

(54) BATTERY MODULE HOUSING SYSTEM WITH INTEGRATED COOLING MEANS

(71) Applicant: Samsung SDI Co., Ltd., Yongin-si (KR)

(72) Inventor: Helmut Rath, St. Veit / Südstmk (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 416 days.

(21) Appl. No.: 16/704,663

(22) Filed: Dec. 5, 2019

(65) Prior Publication Data

US 2020/0185799 A1     Jun. 11, 2020

(30) Foreign Application Priority Data

Dec. 11, 2018  (EP) ..................................... 18211669
Dec. 3, 2019  (KR) ........................ 10-2019-0159225

(51) Int. Cl.
| | | |
|---|---|---|
| *H01M 10/6568* | (2014.01) | |
| *H01M 10/613* | (2014.01) | |
| *H01M 50/227* | (2021.01) | |

(52) U.S. Cl.
CPC ..... *H01M 10/6568* (2015.04); *H01M 10/613* (2015.04); *H01M 50/227* (2021.01)

(58) Field of Classification Search
CPC .......... H01M 10/6568; H01M 10/613; H01M 10/625; H01M 10/6556; H01M 50/20;
(Continued)

(56) References Cited

U.S. PATENT DOCUMENTS

| | | | |
|---|---|---|---|
| 2012/0107663 A1 | 5/2012 | Burgers et al. | |
| 2012/0156543 A1* | 6/2012 | Cicero | H01M 50/10 429/120 |

(Continued)

FOREIGN PATENT DOCUMENTS

| | | |
|---|---|---|
| CN | 101222077 A | 7/2008 |
| CN | 102916234 A | 2/2013 |

(Continued)

OTHER PUBLICATIONS

Chinese Office action issued in corresponding application No. CN 201911256401.2, dated Jan. 4, 2022, 31 pages.

(Continued)

*Primary Examiner* — Kiran Quraishi Akhtar
(74) *Attorney, Agent, or Firm* — Lewis Roca Rothgerber Christie LLP

(57) ABSTRACT

A battery module housing system for cooling a battery module, includes: a lower part having a plate shape, an upper side, and a lower side, the lower part including at least one coolant inlet and at least one coolant outlet that are integrally formed with the lower part; and an upper part to receive the battery module, the upper part having a tub shape and including a bottom tile having an upper side and a lower side, the bottom tile being integrally formed with the upper part. The upper side of the lower part is to be connected to the lower side of the bottom tile to define a cavity between the upper side of the lower part and the lower side of the bottom tile, the cavity defining a liquid-tight hollow interior that is accessible via the at least one coolant inlet and the at least one coolant outlet.

19 Claims, 8 Drawing Sheets

(58) Field of Classification Search
CPC .. H01M 2220/20; H01M 50/227; Y02E 60/10
See application file for complete search history.

(56) References Cited

U.S. PATENT DOCUMENTS

| | | | |
|---|---|---|---|
| 2013/0034767 A1 | 2/2013 | Pentapati et al. | |
| 2013/0192807 A1* | 8/2013 | DeKeuster | |
| 2015/0255835 A1* | 9/2015 | Koller | H01M 10/6556 165/80.4 |
| 2016/0087319 A1 | 3/2016 | Roh et al. | |
| 2016/0141735 A1 | 5/2016 | Motohashi et al. | |
| 2017/0098875 A1 | 4/2017 | Kim | |
| 2018/0006344 A1* | 1/2018 | Ge | F28D 1/0383 |
| 2019/0173064 A1 | 6/2019 | Lee et al. | |

FOREIGN PATENT DOCUMENTS

| | | |
|---|---|---|
| CN | 103201870 A | 7/2013 |
| CN | 104779419 A | 7/2015 |
| CN | 105161789 A | 12/2015 |
| CN | 106099242 A | 11/2016 |
| CN | 106415878 A | 2/2017 |
| CN | 106935928 A | 7/2017 |
| CN | 206412444 U | 8/2017 |
| CN | 108028336 A | 5/2018 |
| WO | 2017/123003 A1 | 7/2017 |

OTHER PUBLICATIONS

EPO Office Action dated Sep. 21, 2020, for corresponding European Patent Application No. 18211669.9 (6 pages).

Extended European Search Report for corresponding European Application No. 18211669.9, dated Apr. 25, 2019, 8pp.

Chinese Office Action, with English translation, dated Jan. 19, 2023, issued in corresponding Chinese Patent Application No. 201911256401.2 (25 pages).

Chinese Office Action, with English translation, dated Aug. 1, 2022, issued in corresponding Chinese Patent Application No. 201911256401.2 (30 pages).

Chinese Notification of Reexamination, with English translation, dated Nov. 7, 2023, issued in corresponding Chinese Patent Application No. 201911256401.2 (25 pages).

* cited by examiner

BATTERY MODULE HOUSING SYSTEM WITH INTEGRATED COOLING MEANS

CROSS-REFERENCE TO RELATED APPLICATION

This application claims priority to and the benefit of European Patent Application No. 18211669.9, filed in the European Patent Office on Dec. 11, 2018, and Korean Patent Application No. 10-2019-0159225, filed in the Korean Patent Office on Dec. 3, 2019, the entire content of both of which is incorporated herein by reference.

BACKGROUND

1. Field

Aspects of example embodiments of the present invention relate to a battery module housing system, and in particular, to a battery module housing system with an integrated cooling system. One or more example embodiments of the present invention relate to a method for manufacturing the battery module housing system with an integrated cooling system. One or more example embodiments of the present invention relate to a battery module housing that is assembled using the battery module housing system according to example embodiments of the present invention, and to a method of assembling the battery module housing system to a battery module housing.

2. Description of the Related Art

In recent years, vehicles for transportation of goods and people have been developed using electric power as a source for motion. Such an electric vehicle may be an automobile that is propelled by an electric motor that uses energy stored in rechargeable batteries. An electric vehicle may be solely powered by batteries or may have a form of a hybrid vehicle that is powered by, for example, a gasoline generator. Furthermore, the vehicle may include a combination of an electric motor and a conventional combustion engine.

In general, an electric-vehicle battery (EVB) or traction battery is a battery used to power the propulsion of battery electric vehicles (BEVs). Electric-vehicle batteries differ from starting, lighting, and/or ignition batteries because they are designed to provide power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as a power supply for small electronic devices, such as cellular phones, notebook computers, camcorders, and the like, while high-capacity rechargeable batteries are used as a power supply for electric vehicles, such as hybrid vehicles and the like.

In general, rechargeable batteries include an electrode assembly including a positive electrode, a negative electrode, and a separator interposed between the positive and negative electrodes, a case for receiving the electrode assembly, and an electrode terminal that is electrically connected to the electrode assembly. An electrolyte solution is injected into the case to enable charging and discharging of the battery via an electrochemical reaction of the positive electrode, the negative electrode, and the electrolyte solution. The shape of the case (e.g., cylindrical, rectangular, or the like) depends on the battery's intended purpose. Lithium-ion (and similar lithium polymer) batteries, which are widely known via their use in laptops and consumer electronics, dominate the most recent group of electric vehicles in development.

Rechargeable batteries may be used as a battery module formed of a plurality of unit battery cells that are coupled in series and/or in parallel with each other, so as to provide a high energy density, particularly for motor driving of a hybrid vehicle. That is, the battery module is formed by interconnecting the electrode terminals of the plurality of unit battery cells depending on a required amount of power and to realize a high-power rechargeable battery.

A battery pack is a set of any suitable number of (generally identical) battery modules. The battery modules may be configured in series, in parallel, or a combination of both to deliver the desired voltage, capacity, and/or power density. Components of battery packs include the individual battery modules, and the interconnects, which provide electrical conductivity between them.

The mechanical integration of such a battery pack requires appropriate mechanical connections between the individual components (e.g., of battery modules), and between the battery pack and a supporting structure of the vehicle. These connections should remain functional and safe during the average service life of the battery system. Further, installation space and interchangeability requirements should be met, especially in mobile applications.

Mechanical integration of battery modules may be achieved by positioning the battery modules on a carrier framework. Fixing (e.g., securing or attaching) the battery cells or battery modules may be achieved by fitted depressions in the framework, or by mechanical interconnectors, for example, such as bolts or screws. Alternatively, the battery modules may be confined (e.g., secured) by fastening side plates to lateral sides of the carrier framework. Further, cover plates may be fixed (e.g., secured or attached) above (e.g., on a top surface) and/or below (e.g., on a bottom surface) of the battery modules.

The carrier framework of the battery pack is mounted to a carrying structure of the vehicle. For example, in a case where the battery pack is to be fixed at the bottom of the vehicle, the mechanical connection may be established from the bottom side by, for example, bolts passing through the carrier framework of the battery pack. The framework is generally made of aluminum or an aluminum alloy to reduce the total weight of the construction.

Typical battery systems, despite any modular structure, generally include a battery housing that serves as an enclosure to seal the battery system against the environment, and provides structural protection of the battery system's components. Housed battery systems are generally mounted as a whole into their application environment (e.g., an electric vehicle).

To provide thermal control of the battery pack, a thermal management system is included to enable safe use of the at least one battery module by efficiently emitting, discharging, and/or dissipating heat generated from the rechargeable batteries. If the heat emission/discharge/dissipation is not sufficiently performed, temperature deviations occur between respective battery cells, such that the at least one battery module may not generate a desired amount of power. In addition, an increase of the internal temperature may lead to abnormal reactions occurring therein, and thus, charging and/or discharging performance of the rechargeable batteries may deteriorate, and the life-span of the rechargeable battery may be shortened. Thus, cell cooling for effective emitting/discharging/dissipating heat from the cells may be desired or required.

A method of cooling the battery module(s) is to provide a cooling system that is integrated into the carrier framework for the battery module(s) as described above. In the following, a carrier framework for battery module(s) may be referred to as "a battery module housing," or as a shortcut, may be referred to simply as "a housing." Moreover, the single noun "battery module" shall also encompass the case that a plurality of battery modules is considered.

A battery module housing with an integrated cooling system may be realized by a box configured for accommodating the battery module. The box may include a bottom plate having a cavity, and a coolant may be streamed through the cavity. Therefore, fresh coolant may be introduced into the cavity via a coolant inlet, and coolant that has received and absorbed heat from the battery module through a part of the housing that separates the battery module from the cavity is removed from the cavity via a coolant outlet.

Accordingly, a battery module housing with an integrated cooling system generally includes a cavity, a coolant inlet, and a coolant outlet as main parts thereof. These main parts may be qualified (e.g., sealed) in order to obtain a liquid-tight coolant area and a liquid-tight outlet of the cooling-connectors against the environment. The cells may be attached to a cooling surface by a kind of thermal interface material in order to secure and enhance the thermal connection. Therefore, at least the part of the housing that separates the battery module from the cavity may be made of a material having a high heat conductivity, for example, such as aluminum, to provide the cooling surface.

FIGS. 1A-1C show a typical (e.g., standard) design of a battery module housing with an integrated cooling system. In the following, expressions such as "bottom," "upper," "lower," and the like are to be considered with regard to a direction z as marked in these figures, which show the tip of an arrow z that is directed upward. A box 20 provides a means for accommodating one or more battery modules 5, and may be manufactured by injection-molding. The inside bottom of the box 20 is covered with a soldered aluminum-plate 10, such that a cavity 30 is formed between the inside bottom of the box 20 and the soldered aluminum-plate 10. To maintain a distance between the inside bottom of the box 20 and a lower side (e.g., a lower surface) of the aluminum-plate 10, one or more risings 70 may be provided on the inside bottom of the box 20. The aluminum-plate 10 serves as a thermal interface material, such that heat is dissipated from a battery module resting on the aluminum-plate 10 and is efficiently conducted to the cavity 30.

Attached to the soldered aluminum-plate 10 are two hoses 12a and 12b that may be formed, for example, of plastic (e.g., one or more plastic materials), and a coolant may be supplied to the cavity 30 or discharged from the cavity 30 (e.g., see FIG. 1A) through the hoses 12a and 12b. The aluminum-plate 10 and the two hoses 12a and 12b usually form one component of the housing, but include different materials.

When inserting the aluminum-plate 10 into the box 20, the hoses 12a and 12b are led (e.g., or fed) through two corresponding through-holes in the bottom plate of the box 20, such that the hoses 12a and 12b extend outwardly from the lower side of the bottom plate of the box 20 as illustrated in FIGS. 1B and 1C. Then, cooling-connectors 22a and 22b are attached and fixed to the lower side of the bottom plate of the box 20, such that parts of the hoses 12a and 12b that extend from the lower side of the bottom plate of the box 20 are each covered by a corresponding one of the cooling-connectors 22a and 22b. The cooling-connectors 22a and 22b may each be a means (e.g., a connection structure) to which a hose or conduit is connected in order to provide/discharge coolant to/from the cavity 30.

To provide for a liquid-tight cavity as well as for liquid-tight connections for introducing and discharging the coolant, sealings (e.g., sealing members) are usually used at junction lines and/or junction planes of different components of the housing.

As discussed above, at least six single components may need to be assembled in order to manufacture a battery module housing with an integrated cooling system according to such typical designs. Moreover, different kinds of materials (e.g., plastic, aluminum, and/or the like) may be combined during the manufacturing process. Further, the manufacturing process is generally performed manually, which may be time-consuming and cost-intensive.

Further, housed battery modules are generally mounted as a whole into their application environment (e.g., an electric vehicle). Thus, the replacement of defective system parts (e.g., a defective battery module) may require dismounting the whole battery module housing, and removing the defective system parts from the housing. When the housing is assembled from a large number of components, defects of even small and/or cheap system parts may require a complex process of dismounting the battery system, replacement of the battery module, and remounting the battery system.

The above information disclosed in this Background section is for enhancement of understanding of the background of the invention, and therefore, it may contain information that does not constitute prior art.

SUMMARY

One or more example embodiments of the present invention are directed to a battery module housing and a battery module housing system, a method for manufacturing the battery module housing system, and/or a method for assembling the battery module housing system into a battery housing. One or more example embodiments of the present invention are directed to a battery module housing and a battery module housing system having a reduced number of components, and/or a reduced number of materials used in the battery module housing and the battery module housing system. One or more example embodiments of the present invention are directed to a simplified manufacturing process of the battery module housing system compared to that of the related art.

One or more of the various aspects and features of the present invention may provide, for example, no different material pairings, reduction of a complexity of a manufacturing process of an aluminum cooler, reduction of a number of assembly steps, reduction of a number of parts (e.g., ASM-cooler, sealings or sealing members, cooling-connectors, and/or the like), and/or reduction of assembly costs.

In brief overview, one or more example embodiments of the present invention may enable an integration of a cooler in an injection-molded battery module housing bottom part, to reduce or eliminate complex manufacturing processes of an aluminium cooler, and for the assembly of the cooler to a housing and cooling connections while reducing or eliminating the need and/or an amount of sealing interfaces.

The following general description of the invention as well as the claims use terms such as "lower part," "upper part," "lower side," "upper side," and the like. However, these terms are merely used to distinguish one element from another element. Thus, these terms do not limit the invention or the claimed subject-matter to a particular direction in which the devices and modules described herein (e.g., the battery module housing system) is to be held, positioned, built, or assembled. In other words, a "lower element" (e.g., a lower part, a lower side, and/or the like) may be named a "first element" (e.g., a first part, a first side, and/or the like), and similarly, an "upper element" (e.g., an upper part, an upper side, and/or the like) may be named a "second element," without departing from the spirit and scope of the present invention. Likewise, a "lower element" may be deemed a "second element," and an "upper element" may be deemed a "first element," or any other suitable terminology that preserves the distinguishability of the different elements.

Further, these terms as used within the present specification are selected to be read with regard to a particular predefined direction (e.g., a (virtual) z-axis), where the z-axis defines an orientation of an upward direction. Thus, according to the following description and the claims, the orientation may be described with regard to the orientation of the z-axis, wherein the z-axis may be oriented opposite to the direction of the gravitational field. This may increase the comprehensibility of the description and the claims, but does not limit the claimed subject-matter to such an orientation. In other words, the virtual z-axis, with respect to which the invention and/or the claimed subject-matter is described, may be oriented into any suitable direction, for example, the z-axis may be oriented in the direction opposite to a gravitational field, but may also be oriented in any suitable direction in a 3-dimensional space.

One or more aspects and features of the invention relate to a battery module housing system for cooling a battery module. The battery module housing includes a lower part (e.g., a first part) and an upper part (e.g., a second part). The lower part has a plate shape. The lower part has an upper side and a lower side, the lower side being opposite to the upper side with respect to the lower part. The upper side of the lower part is connectable to the upper part. For example, the upper side of the lower part may be connectable to a lower side of a bottom tile of the upper part. The lower part further has at least one coolant inlet and at least one coolant outlet. Also, the lower part inclusive of the coolant inlet(s) and the coolant outlet(s) is formed integrally.

The upper part has a tub shape. The upper part is configured for accommodating a battery module. The upper part has a bottom tile with an upper side and a lower side, the lower side being opposite to the upper side with respect to the bottom tile. The lower side of the bottom tile is connectable to the upper side of the lower part. Also, the upper part is formed integrally. The upper side of the lower part and/or the lower side of the bottom tile are formed such that, when the upper side of the lower part is connected to the lower side of the bottom tile, a cavity is formed between the upper side of the lower part and the lower side of the bottom tile. The upper side of the lower part and/or the lower side of the bottom tile may have a depression. The cavity forms a liquid-tight hollow, which is only accessible via the coolant inlet(s) and the coolant outlet(s).

The expression "formed integrally" as used in this specification shall denote in this context that the component formed integrally is made in one piece and as one piece (e.g., a unitary component).

Accordingly, in some embodiments, the battery module housing system (hereinafter also referred to as "housing system" or simply as "system") includes two parts, a lower part and an upper part, each of which is formed integrally. Further, in some embodiments, the battery module housing system may be in two states: (i) an "unconnected state" or a "non-assembled state" (e.g., a state in which the lower part and the upper part are not connected or not attached to each other, for example, the lower part and the upper part are separated from each other); and (ii) a "connected state" or an "assembled state," (e.g., a state in which the lower part and the upper part are connected or attached to each other, for example, including the case that the lower part and the upper part are fixedly connected to each other). For example, the formulation that the housing system is "in a connected state" or "in an assembled state" refers to the case that the lower part and the upper part of the system are connected/attached to each other such that a cavity is formed between the upper side of the lower part and the lower side of the bottom tile, the cavity defining a liquid-tight hollow interior, which is only accessible via the coolant inlet(s) and the coolant outlet(s). Further, in case that the housing system is in the "connected state" or "assembled state" as described above, the housing system is shortly referred to as "battery module housing" or simply as "housing."

In one embodiment of the battery module housing system according to the invention, the lower part is manufactured in one piece by injection molding.

In one embodiment of the battery module housing system according to the invention, the upper part is manufactured in one piece by injection molding.

In a further embodiment of the battery module housing system, the lower part is made of plastics or resin.

In an alternative embodiment, the upper part is made of plastics or resin.

In a preferred embodiment of the battery module housing system, an additive is included in the upper part, the additive being suitable to increase the heat conductivity of the upper part. The additive may have been added to a plastic-granulate, with which the upper part has been formed during the manufacturing process. It is desirable to have a high heat conductivity, in particular of the bottom tile of the upper part, because heat can be easily dissipated and/or conducted from a battery module in contact with or in the vicinity of the upper side of the bottom tile to the lower side of the bottom tile, which acts as one confinement of the cavity when the housing system is in the assembled state. Then, the heat can be absorbed by a coolant present in the cavity and eventually discharged together with the coolant.

According to one embodiment of the battery module housing system, the upper side of the lower part and the lower side of the bottom tile are congruent or substantially congruent (e.g., essentially congruent). The cavity may have a flat shape and may extend along the lower side of the bottom tile. Then, a common surface of the bottom tile and the cavity may have a suitable size (e.g., a maximum size) such that a surface (e.g., a cooling surface) through which heat can be conducted from the upper side of the bottom tile to the cavity (and to a coolant therein) is increased or maximized.

In one embodiment of the battery module housing system, a depression is formed on the upper side of the lower part and is confined (e.g., surrounded) by a wall, for example a closed wall, rising (e.g., extending) along the edge of the upper side of the lower part, wherein the upper side of the lower part is connectable via the wall to the lower side of the bottom tile. The depression provides a way to form a cavity between the lower side of the bottom tile and the upper side of the lower part.

In another embodiment, a depression is formed on the lower side of the bottom tile and is confined (e.g., surrounded) by a wall, for example a closed wall, rising (e.g., extending) along the edge of the lower side of the bottom tile, wherein the lower side of the bottom tile is connectable via the wall to the upper side of the lower part.

In an alternative embodiment, a first depression is formed on the upper side of the lower part and is confined (e.g., surrounded) by a first wall, for example a first closed wall, rising (e.g., extending) along the edge of the upper side of the lower part, a second depression is formed on the lower side of the bottom tile and is confined (e.g., surrounded) by a second wall, for example a second closed wall, rising (e.g., extending) along the edge of the lower side of the bottom tile, and the lower part and the bottom tile are connectable such that the first wall and the second wall rest on (e.g., are in contact with or are connected to) each other along their entire (e.g., complete) lengths.

The term "closed wall" as used herein denotes a wall extending along a closed line or closed curve, for example, a line or curve not having a start point or an end point such as a circle, square, rectangle, and/or the like.

In one embodiment of the battery module housing system, each coolant inlet includes an inlet through-hole extending through the lower part and an inlet connector formed at (e.g., on) a lower side of the lower part, the inlet connector being configured to be connected to a delivering ductwork, for example a hose or a conduit, such that coolant delivered by the delivering ductwork is led through the inlet through-hole to the upper side of the lower part. Such a design of a lower part with coolant inlet(s) may simplify the manufacturing process of an integrally formed lower part.

Correspondingly, each coolant outlet includes an outlet through-hole extending through the lower part and an outlet connector formed on a lower side of the lower part, the outlet connector being configured to be connected to a discharge ductwork, for example a hose or a conduit, such that coolant can be led from the upper side of the lower part through the outlet through-hole into the discharge ductwork. Such a design of a lower part with coolant outlet(s) may further simplify the manufacturing process of an integrally formed lower part.

Each inlet connector and each outlet connector is shaped as pin formed on the lower side of the lower part at the location of the respective through-hole through the lower part, the respective through-hole extending further through the pin. A pin provides a connecting means (e.g., a connector) for connecting a ductwork such as a hose or a conduit.

In one embodiment of the battery module housing system according to the invention, at least on one of the upper side of the lower part and the lower side of the bottom tile is formed a guiding geometry (or guiding structure) suitable for guiding a coolant streaming into the cavity via the coolant inlet to the coolant outlet along at least one path. The path may have a plurality of branches, a plurality of junctions and/or a plurality of by-passes. Such a design increases the regions where coolant is actually streaming along the lower side of the bottom tile (e.g., increases a replacement of already heated coolant by "fresh" coolant newly supplied through the inlet connector).

According to an embodiment of the battery module housing system, the guiding geometry is further configured to prevent or substantially prevent a coolant flowing from the coolant inlet to the coolant outlet from taking a straight line from the coolant inlet to the coolant outlet.

In one embodiment of the battery module housing system, on at least on one of the upper side of the lower part and the lower side of the bottom tile are formed a plurality of risings suitable for increasing the mechanical stability of the assembled battery module housing system (e.g., the battery module housing). For example, the burst-pressure properties (e.g., the mechanical stability against burst leakage) of the assembled battery module housing system may be increased in such a design.

In some embodiments, the risings are therefore located at least at (e.g., in or on) a center of the cavity of the battery module system when in the assembled state.

According to an embodiment of the battery module housing system, the risings are formed at least on one of the upper side of the lower part and the lower side of the bottom tile. Each of the risings extends to the opposite side (e.g., opposite surface) of the cavity when the battery module system is in the assembled state.

In one embodiment of the battery module housing system, both the upper side of the lower part and the lower side of the bottom tile have a rectangular shape. The upper part includes four side tiles rising on (e.g., extending from) the upper side of the bottom tile so as to form an open box.

According to one embodiment of the battery module housing system, the lower part and the upper part are configured to be connected by welding. The welding may be performed, for example, by plastic welding, mirror welding, friction welding, or high-frequency welding.

According to another embodiment of the battery module housing system, the lower part and the upper part are in a connected state such that a cavity is formed between the upper side of the lower part and the lower side of the bottom tile, wherein the cavity forms a liquid-tight hollow only accessible via the coolant inlet(s) and the coolant outlet(s). In other words, according to this embodiment, the battery module housing system has been assembled so as to form a battery module housing. In some embodiments, the connection of the lower part and the upper part is performed by welding, for example, by plastic welding, mirror welding, friction welding, or high-frequency welding.

Another aspect of the invention relates to a method for manufacturing the above described battery module housing system. The method includes: manufacturing, in one piece (e.g., integrally), a lower part of the system, the lower part having a plate shape, an upper side, and a lower side, the lower side being opposite to the upper side with respect to the lower part, wherein the upper side of the lower part is configured to be connected to an upper part of the system, and the lower part includes at least one coolant inlet and at least one coolant outlet. For example, the upper side of the lower part may be configured to be connected to a lower side of a bottom tile of the upper part.

The method may further include manufacturing, in one piece (e.g., integrally), the upper part of the system, the upper part including a tub shape, the upper part being configured to receive (e.g., accommodate) a battery module, and the upper part including a bottom tile having an upper side and a lower side, the lower side being opposite to the upper side with respect to the bottom tile, wherein the lower side of the bottom tile is configured to become connected to the upper side of the lower part such that a cavity is formed between the upper side of the lower part and the lower side of the bottom tile, wherein the cavity forms a liquid-tight hollow interior that is only accessible via the coolant inlet(s) and the coolant outlet(s).

In an example embodiment, the manufacturing of the lower part of the system is performed by injection molding. Alternatively or in addition, the manufacturing of the upper part of the system may be performed by injection molding.

Another aspect of the invention relates to a method for assembling the above described battery module housing system (e.g., a method for transforming the battery module housing system from an unconnected state into a connected or assembled state as defined above or, in other words, a method for assembling the battery module housing system into a battery module housing). The method includes: connecting the lower part and the upper part of the battery module housing system such that a cavity is formed between the upper side of the lower part and the lower side of the bottom tile of the upper part.

As used herein, the term "cavity" may refer to a liquid-tight cavity or a liquid-tight hollow interior.

In an example embodiment of the method for assembling, the method further includes: welding the lower part to the upper part, for example, by plastic welding, mirror welding, friction welding, or high-frequency welding.

The welding may be performed along a welding line (e.g., a predefined welding line). The welding line may be located on an edge (or bezel) of at least one of the upper side of the lower part and the lower side of the bottom tile of the upper part.

Further aspects and features of the present invention may be learned from the dependent claims or the following description.

In brief summary, one or more embodiments of the present invention are directed to providing coolant-channels in a two-part injection molded battery module housing system, and joining (e.g., connecting or assembling) these two parts with a suitable welding process (e.g., a plastic-welding process, such as mirror welding, friction welding, high frequency welding, and/or the like). The welded housing parts form a cavity or hollow interior, where coolant may circulate therein.

To increase the heat conduction of the upper part, an additive may be added to plastic-granulate for the upper-part during the manufacture process.

To increase the burst-pressure property, the guiding-geometry and additional points (e.g., contact points or support structure points) can also be designed and joint together with the upper part and the lower-part.

Accordingly, in an example embodiment, a battery module housing system for cooling a battery module is provided. The battery module housing system includes: a lower part having a plate shape, an upper side, and a lower side opposite to the upper side of the lower part, the lower part including at least one coolant inlet and at least one coolant outlet that are integrally formed with the lower part; and an upper part configured to receive the battery module therein, the upper part having a tub shape and including a bottom tile having an upper side and a lower side opposite to the upper side of the bottom tile, the bottom tile being integrally formed with the upper part. The upper side of the lower part is configured to be connected to the lower side of the bottom tile to define a cavity between the upper side of the lower part and the lower side of the bottom tile, the cavity defining a liquid-tight hollow interior that is accessible via the at least one coolant inlet and the at least one coolant outlet.

In some embodiments, the lower part may be formed as a unitary component by injection molding, and/or the upper part may be formed as a unitary component by injection molding.

In some embodiments, the lower part may include plastic or resin; and/or the upper part may include plastic or resin, and an additive to increase heat conductivity of the upper part.

In some embodiments, the upper side of the lower part and the lower side of the bottom tile may be congruent with each other; and the cavity may have a flat shape, and may extend along the lower side of the bottom tile.

In some embodiments, the upper side of the lower part may include a depression and a wall protruding from the upper side of the lower part and surrounding the depression, the wall extending along an edge of the upper side of the lower part and configured to connect the upper side of the lower part to the lower side of the bottom tile.

In some embodiments, the lower side of the bottom tile may include a depression and a wall protruding from the lower side of the bottom tile and surrounding the depression, the wall extending along an edge of the lower side of the bottom tile and configured to connect the lower side of the bottom tile to the upper side of the lower part.

In some embodiments, the upper side of the lower part may include a first depression and a first wall protruding from the upper side of the lower part and surrounding the first depression, the first wall extending along an edge of the upper side of the lower part, the lower side of the bottom tile may include a second depression and a second wall protruding from the lower side of the bottom tile and surrounding the second depression, the second wall extending along an edge of the lower side of the bottom tile, and the lower part and the bottom tile may be configured to be connected to each other via the first and second walls such that the first wall and the second wall contact each other along their entire lengths.

In some embodiments, each coolant inlet may have an inlet through-hole that extends through the lower part and may include an inlet connector at the lower side of the lower part, the inlet connector being configured to be connected to a delivery ductwork to receive coolant from the delivery ductwork through the inlet through-hole and to provide the coolant to the upper side of the lower part; each coolant outlet may have an outlet through-hole that extends through the lower part and may include an outlet connector at the lower side of the lower part, the outlet connector being configured to be connected to a discharge ductwork to discharge coolant from the upper side of the lower part through the outlet through-hole to the discharge ductwork; and each of the inlet connector and the outlet connector may have a pin shape at the lower side of the lower part corresponding to the inlet through-hole and the outlet through-hole, such that the inlet through-hole and the outlet through-hole further extend through the pin shape of the inlet connector and the outlet connector, respectively.

In some embodiments, at least one of the upper side of the lower part and the lower side of the bottom tile may include a guiding structure configured to direct coolant that is flowing into the cavity via the coolant inlet towards the coolant outlet along at least one path, and the at least one path may include a plurality of branches, a plurality of junctions, and/or a plurality of by-passes.

In some embodiments, the guiding structure may be configured to prevent coolant that is flowing into the cavity via the coolant inlet from flowing out to the coolant outlet along a straight path.

In some embodiments, at least one of the upper side of the lower part and the lower side of the bottom tile may include one or more risings configured to support the bottom tile when the battery module housing system is an assembled state to increase the mechanical stability of the battery module housing system when in the assembled state, such that one or more burst-pressure properties of the assembled battery module housing system is improved, and the one or more risings may be located at least at a center of the cavity of the battery module system when in the assembled state.

In some embodiments, the one or more risings may extend from one side of the cavity to an opposite side of the cavity when the battery module system is in the assembled state.

In some embodiments, each of the upper side of the lower part and the lower side of the bottom tile may have a rectangular shape, and the upper part may further include four side tiles extending from the upper side of the bottom tile to form an open box shape.

In some embodiments, the lower part and the upper part may be configured to be connected to each other by welding, and the welding may include plastic welding, mirror welding, friction welding, or high-frequency welding.

In some embodiments, the lower part may be connected to the upper part via welding to define the liquid-tight hollow cavity therebetween, and the welding may include plastic welding, mirror welding, friction welding, or high-frequency welding.

According to another embodiment, a method for manufacturing a battery module housing system is provided. The method includes: forming a lower part as a unitary component, the lower part having a plate shape, an upper side, and a lower side opposite to the upper side of the lower part, the lower part including at least one coolant inlet and at least one coolant outlet; and forming an upper part as a unitary component, the upper part having a tub shape and configured to receive a battery module of the battery module system, and including a bottom tile having an upper side and a lower side opposite to the upper side of the bottom tile. The lower side of the bottom tile is configured to be connected to the upper side of the lower part to define a cavity between the upper side of the lower part and the lower side of the bottom tile, the cavity defining a liquid-tight hollow interior that is accessible via the at least one coolant inlet and the at least one coolant outlet.

In some embodiments, the lower part may be formed as the unitary component by injection molding; and/or the upper part may be formed as the unitary component by injection molding.

In some embodiments, the method may further include: welding the lower side of the bottom tile to the upper side of the lower part to define the cavity therebetween, and the welding may include plastic welding, mirror welding, friction welding, or high-frequency welding.

According to another embodiment, a method for assembling a battery module housing system is provided. The battery module housing system includes a lower part and an upper part, the lower part having a plate shape, an upper side, and a lower side opposite to the upper side of the lower part, the lower part including at least one coolant inlet and at least one coolant outlet, and the upper part having a tub shape and configured to receive a battery module of the battery module system, and including a bottom tile having an upper side and a lower side opposite to the upper side of the bottom tile. The method includes: connecting the lower part to the upper part to define a cavity between the upper side of the lower part and the lower side of the bottom tile of the upper part.

In some embodiments, the method may further include: welding the lower part to the upper part along a welding line along an edge of at least one of the upper side of the lower part and the lower side of the bottom tile of the upper part, and the welding may include plastic welding, mirror welding, friction welding, or high-frequency welding.

DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1A:
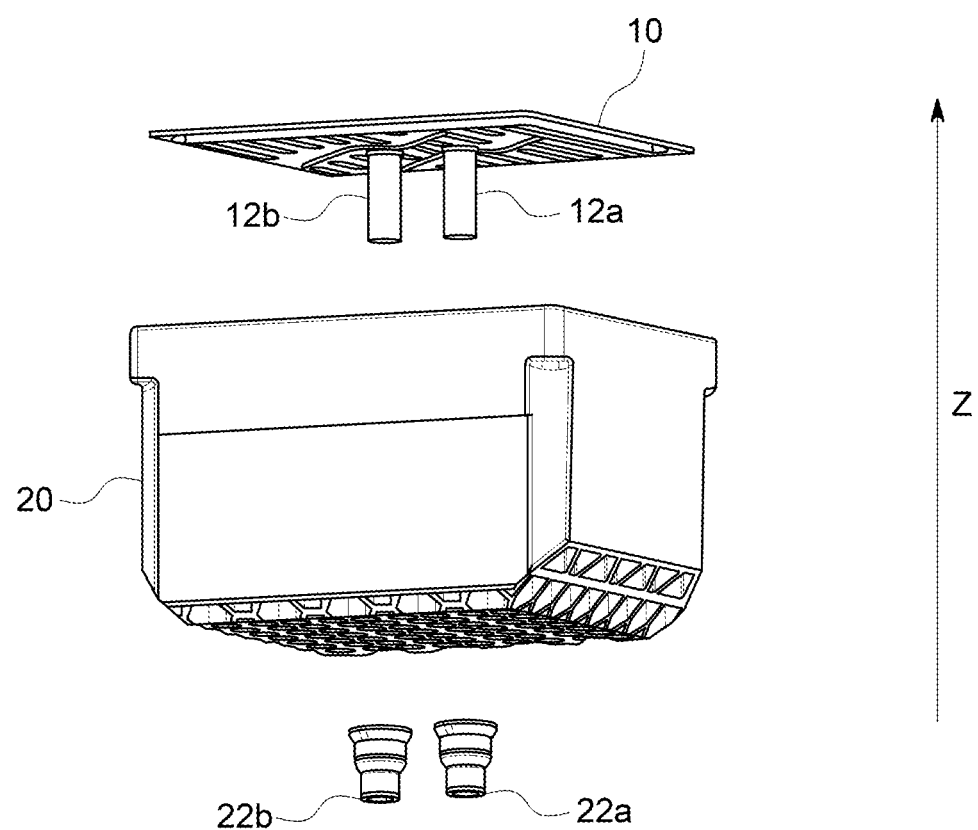
FIG. 1A illustrates a schematic exploded view of a battery module housing.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. For example, in the drawings, the size or thickness of each element may be arbitrarily shown for illustrative purposes, and thus, the embodiments of the present invention should not be construed as being limited thereto.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. As used herein, the terms "upper," "lower," and the like are defined according to the z-axis. For example, an upper cover (e.g., a cover) may be positioned at an upper part in the z-axis direction, whereas a lower cover (e.g., a ground lower part 100) may be positioned at a lower part thereof.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention. For example, a first element may be named a second element, and similarly, a second element may be named a first element, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations or deviations in measured or calculated values that would be recognized by those of ordinary skill in the art. Further, if the term "substantially" is used in combination with a feature that could be expressed using a numeric value, the term "substantially" denotes a range of ±5% of the value centered on the value. The use of "may" when describing embodiments of the present invention refers to "one or more embodiments of the present invention." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
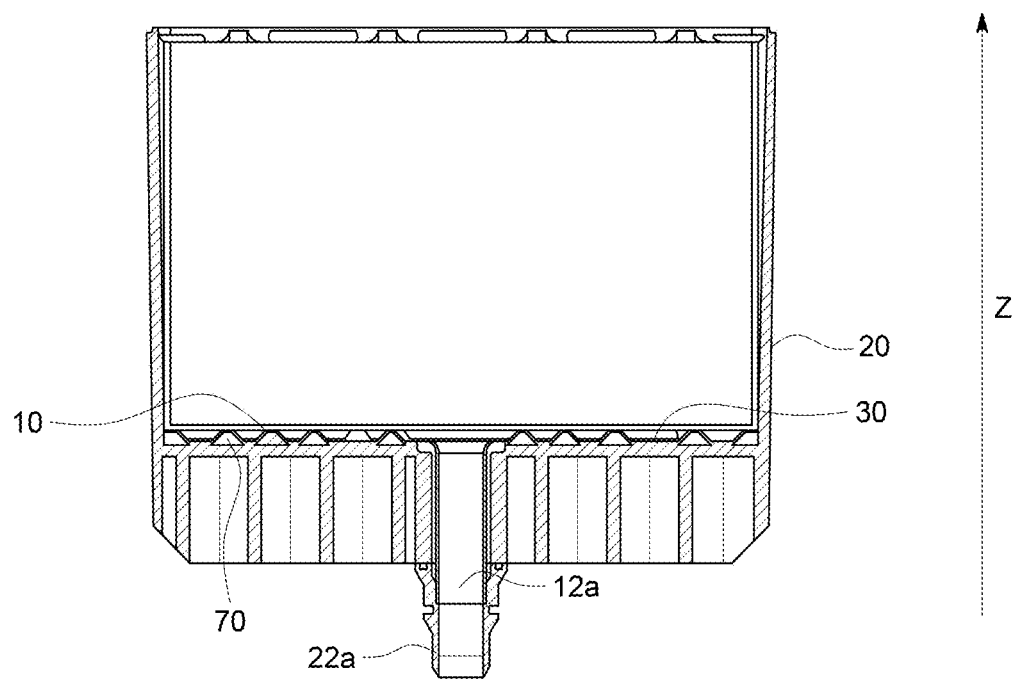
FIG. 1B illustrates a schematic cross-sectional view of the battery module housing of FIG. 1A.
Figure 1C:
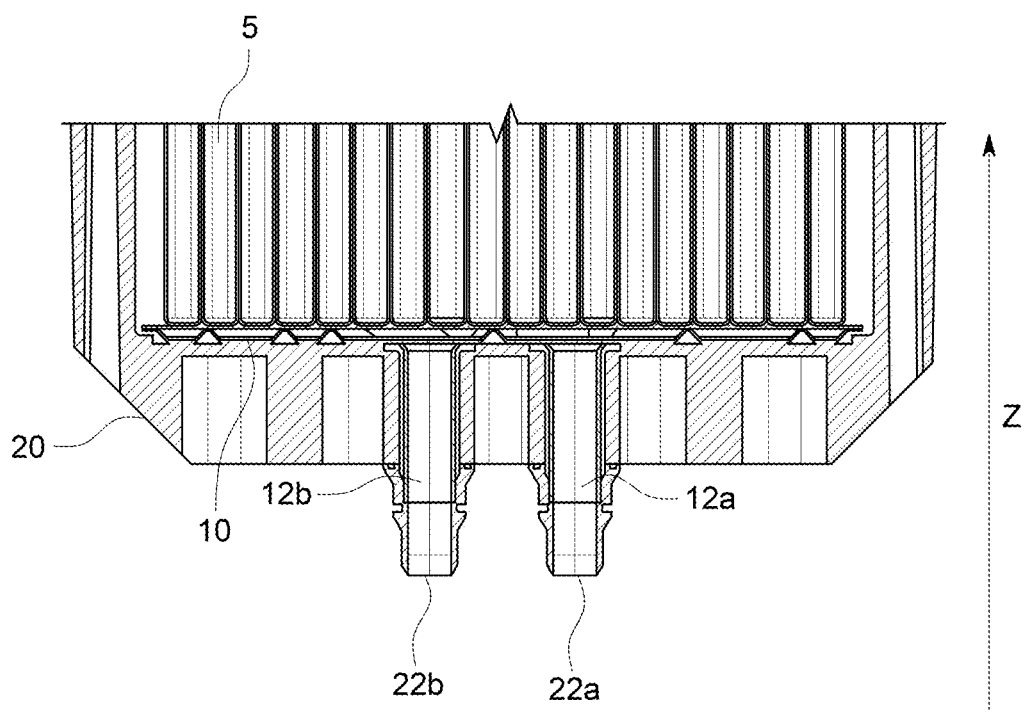
FIG. 1C illustrates a schematic cross-sectional view of the battery module housing of FIG. 1A, the cross-sectional view of FIG. 1C being perpendicular to the cross-sectional view of FIG. 1B.

FIGS. 1A through 1C have already been described above in the background section.

Figure 2A:
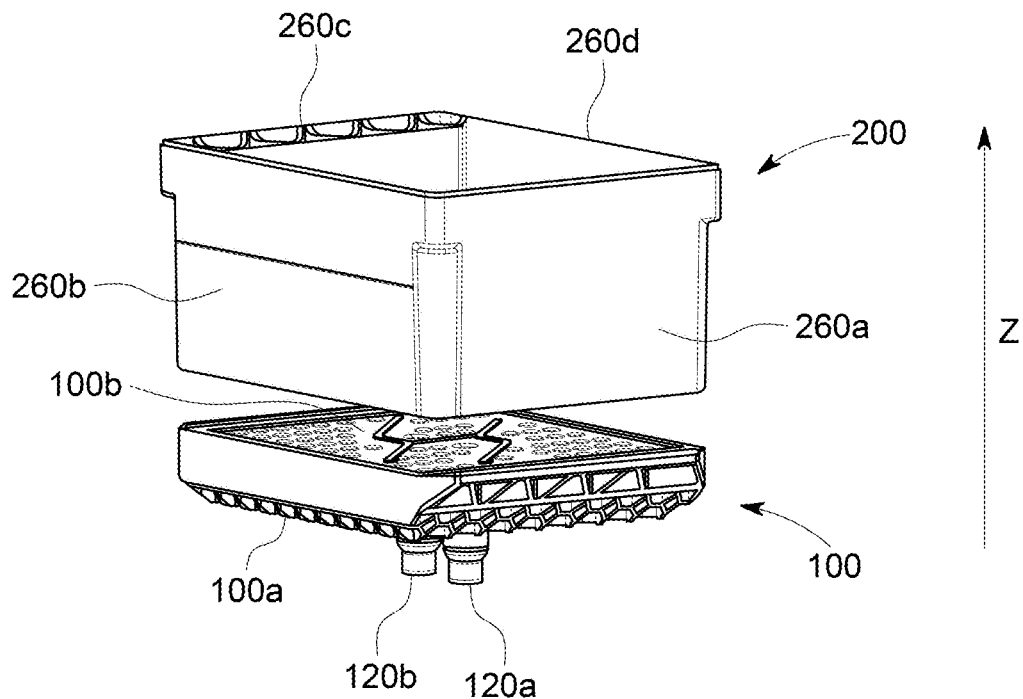
FIG. 2A illustrates a schematic exploded view of a battery module housing in a non-assembled state according to an embodiment of the invention.

FIG. 2A is an exploded view of a battery module housing system according to an embodiment of the invention. FIG. 2A shows a view of the battery module housing system in a non-assembled state (e.g., an unconnected or non-connected state).

Referring to FIG. 2A, an upper part 200 of the housing system is formed to have a shape of a tub. For example the tub shape of the upper part 200 is similar to a shape of an open box, such that the upper part 200 includes a bottom tile (or bottom portion) 260 (e.g., see FIGS. 3B and 3C) and four side tiles (e.g., four side portions) 260a, 260b, 260c, and 260d. The upper part 200 is manufactured as one piece (e.g., integrally or as a unitary component), for example, from plastic or resin. For example, in some embodiments, the upper part 200 including the bottom tile 260 and the four side tiles 260a, 260b, 260c, and 260d may be integrally formed as a unitary component using injection molding. Additives that increase the heat conductivity of the material of the upper part 200 may be added to plastic-granulate, for example, during the manufacturing process. One or more battery modules 5 (e.g., see FIG. 3C) may be accommodated in the upper part 200, to rest on an upper side (or on an upper surface) of the bottom tile 260. A lower part 100 of the housing system is formed to have a plate shape, such that the lower part 100 may have a lower side (or lower surface) 100a and an upper side (or an upper surface) 100b that is opposite to the lower side 100a with respect to the lower part 100.

Each of the upper side 100b of the lower part 100 and the lower side of the bottom tile 260 may have the same or substantially the same shape. For example, each of the upper side 100b of the lower part 100 and the lower side of the bottom tile 260 may have a rectangular shape, a circular shape, an elliptical shape, and/or the like. Further, the upper side 100b of the lower part 100 may correspond to the lower side of the bottom tile 260. For example, the upper side 100b of the lower part 100 may be congruent or substantially congruent (e.g., essentially congruent) to the lower side of the bottom tile 260. Accordingly, these surfaces (e.g., the upper side 100b and the lower side of the bottom tile 260) may match when connected to each other, so that each corner of the lower side of the bottom tile 260 corresponds to (e.g., is on or rests on) a respective corner of the upper side 100b of the lower part 100 (e.g., see FIGS. 3A through 3C).

Two connectors, an inlet connector 120a and an outlet connector 120b, are connected to or attached to the lower side 100a of the lower part 100. The inlet connector 120a and the outlet connector 120b may provide for a connection of hoses or conduits to supply coolant and/or to discharge coolant, respectively. In some embodiments, the lower part 100 and the connectors (e.g., the inlet and outlet connectors 120a and 120b) are manufactured integrally (e.g., unitarily or as a unitary component). For example, in some embodiments, the lower part 100 including the connectors (e.g., the inlet and outlet connectors 120a and 120b) may be integrally formed as a unitary component using injection molding. In some embodiments, each of the connectors (e.g., the inlet and outlet connectors 120a and 120b) may have a pin shape, but the present invention is not limited thereto.

Figure 2B:
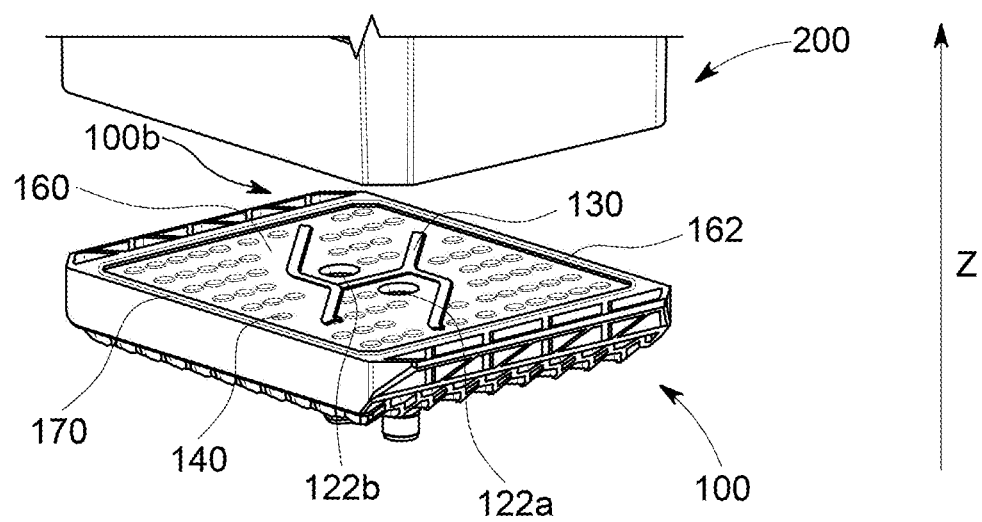
FIG. 2B illustrates a portion of the exploded view of a battery module housing according to an embodiment of the invention.

FIG. 2B illustrates an enlarged portion of the housing system shown FIG. 2A in more detail. In FIG. 2B, a distance between the lower part 100 and the upper part 200 is expanded (e.g., increased) to illustrate the upper side 100b of the lower part 100 having the plate shape in more detail. A depression 160 may be formed on the upper side 100b of the lower part 100. The depression 160 may extend over substantially the entire surface (e.g., almost over the whole surface) of the upper side 100b, except for a small wall (or protruding lip) 162 that surrounds (e.g., a periphery of) the depression 160. In other words, the small wall 162 protrudes from (e.g., rises on) the upper side 100b of the lower part 100 at (e.g., on) an edge (or a bezel) of the lower part 100, such that the wall 162 surrounds (e.g., encompasses or confines) the depression 160 in any direction that is perpendicular to the z-axis shown in the figures (e.g., any direction that is parallel to or substantially parallel to the upper side 100b of the lower part 100).

When the upper part 200 of the housing system is connected to the lower part 100 as described above, the wall 162 and the depression 160 may define (e.g., form) a hollow area or cavity 300 (e.g., see FIG. 3B) at (e.g., in) an area defined by the depression 160. The cavity 300 is enclosed (e.g., confined) by the wall 162 in directions that are perpendicular to the z-axis. The cavity 300 is enclosed (e.g., confined) by the lower side of the bottom tile 260 of the upper part 200 in the direction of the z-axis. The cavity 300 is enclosed (e.g., confined) by the upper side 100b of the lower part 100 in an opposite direction to the direction of the z-axis.

Figure 3A:
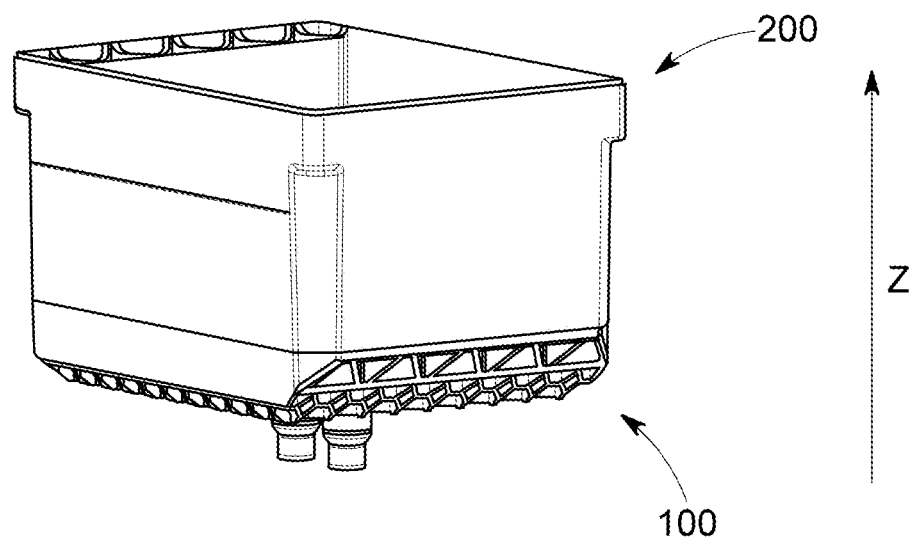
FIG. 3A illustrates a schematic perspective view of a battery module housing in an assembled state according to an embodiment of the invention.
Figure 3B:
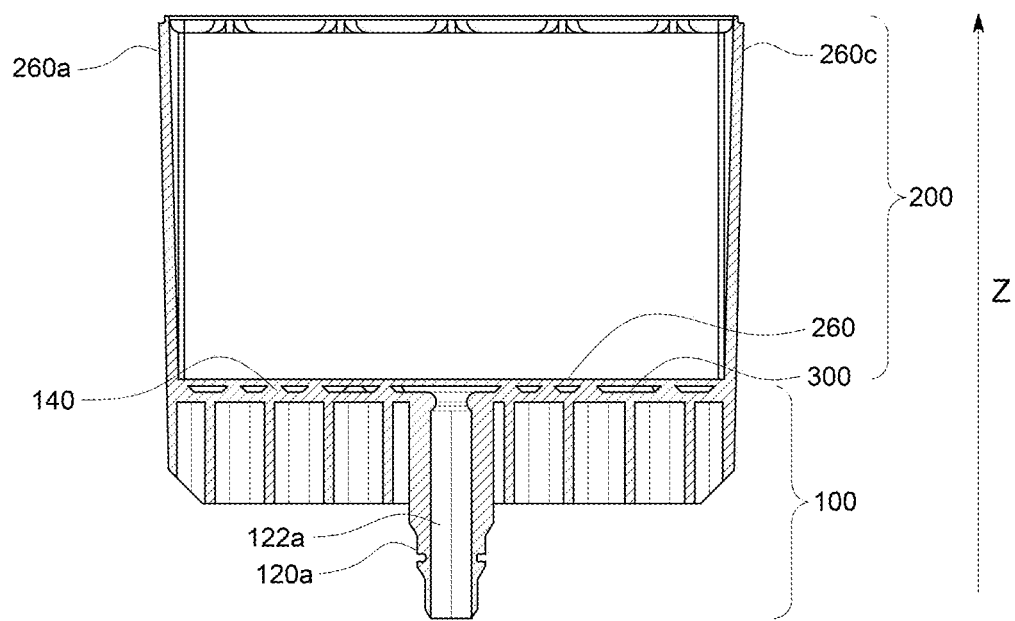
FIG. 3B illustrates a schematic cross-sectional view of a battery module housing in an assembled state according to an embodiment of the invention.
Figure 3C:
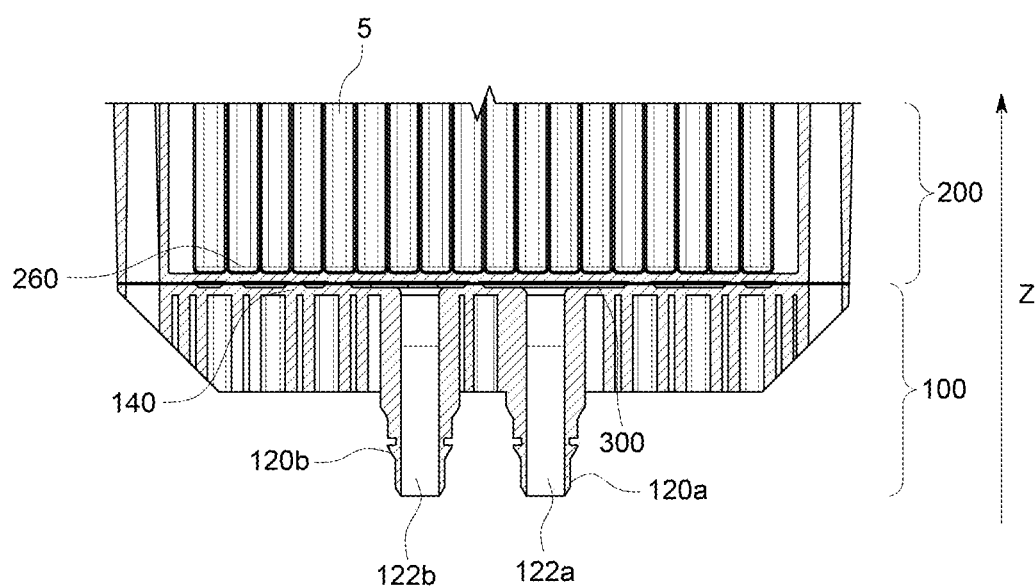
FIG. 3C illustrates a schematic cross-sectional view of a battery module housing in an assembled state according to an embodiment of the invention, the cross-sectional view of FIG. 3C being perpendicular to the cross-sectional view of FIG. 3B.

Two cross sectional views of the assembled battery module housing system (e.g., the battery module housing) with the cavity 300 formed between the lower part 100 and the upper part 200 are shown in FIGS. 3B and 3C. The lower side of the bottom tile 260 contacts (e.g., touches) the upper side 100b of the lower part 100 at (e.g., in) a region of the wall 162. However, the lower side of the bottom tile 260 does not contact (e.g., does not touch) the upper side 100b of the lower part 100 at (e.g., in) a region of the cavity 300, except in some embodiments, for example, at areas (or regions) of the cavity 300 where a guiding structure and/or welding points are formed, as will be discussed in more detail below.

In order to supply coolant to the cavity 300, an inlet through-hole 122a is arranged at (e.g., formed in) the lower part 100. The inlet through-hole 122a is located at a position corresponding to that of the inlet connector 120a, and extends through the inlet connector 120a. Similarly, in order to discharge coolant from the cavity 300, an outlet through-hole 122b is arranged at (e.g., formed in) the lower part 100. The outlet through-hole 122b is located at a position corresponding to that of the outlet connector 120b, and extends through the outlet connector 120b.

Further, to enable the coolant that is supplied to the cavity 300 to stream (e.g., flow) along a suitable area (e.g., a maximum area) beneath the lower side of the bottom tile 260 of the upper part 200, a guiding structure may be provided at (e.g., in or on) the cavity 300. In the embodiment shown in FIG. 2B, a guiding structure 130 is provided on the upper side 100b of the lower part 100, but the present invention is not limited thereto, and in another embodiment, the guiding structure 130 may be provided on the lower side of the bottom tile 260. The guiding structure 130 forms walls within an interior of the cavity 300 that may not be pervaded by the coolant. Thus, the walls of the guiding structure 130 may direct (e.g., lead) coolant that is flowing within the cavity 300 along a suitable (e.g., predefined) coolant flow path that may be defined by a structure or arrangement of the walls (e.g., by the guiding structure 130). For example, the wall of the guiding structure 130 may be formed to prevent or substantially prevent coolant from taking a direct path between the coolant inlet through-hole 122a and the coolant outlet through-hole 122b. Accordingly, an area of the lower side of the bottom tile 260 that is cooled by the coolant stream may be increased or maximized. Further branches and junctions of the guiding structure 130 may be provided to further guide the coolant along the lower side of the bottom tile 260.

When one or more battery modules are accommodated in the upper part 200, the bottom tile 260 may sag or may be extruded into the cavity 300. Thus, a volume of the cavity 300 may be decreased and/or the bottom tile 260 may be deformed. A deformation of the bottom tile 260 may cause a decrease of a contact area between the battery module(s) arranged (e.g., resting) thereon, and correspondingly, may cause a decrease of heat dissipation between the battery module(s) via the bottom tile 260 to the cavity 300, and to the coolant streaming (e.g., flowing) through the cavity 300.

In order to prevent the bottom tile 260 from sagging or from being extruded into the cavity 300, one or more support structures may be provided at (e.g., in or on) the interior of the cavity 300. These support structures are configured to support, in addition to the wall 162 and/or the guiding structure 130 that is included in some embodiments, the bottom tile 260 when connected to (e.g., or resting on) the lower part 100 in an assembled state of the battery module housing system. In some embodiments, the support structures may include (or be realized as) welding points 140, which are described in more detail below. Accordingly, the overall mechanical stability of the housing system may be increased (or improved), and in particular, the burst-pressure properties of the housing system may be improved, for example, by improving the mechanical stability against burst leakage.

FIG. 3A shows a battery module housing according to an embodiment of the invention. FIG. 3A shows the battery module housing system in an assembled state. The upper part 200 of the system is attached and connected to the lower part 100 of the system. In some embodiments, the connection is a fixed connection. The fixed connection may be achieved by welding, for example, such as by plastic welding, mirror welding, friction welding, high-frequency welding, and/or the like. In some embodiments, the welding is performed along a suitable welding line (e.g., a predefined welding line) 170 that extends along the wall 162 that is arranged on the upper side 100b of the lower part 100 (e.g., see FIG. 2B). Accordingly, the lower part 100 and the upper part 200 of the system may be fixedly connected (e.g., merged) together to form a liquid-tight configuration. In some embodiments, to further improve the liquid-tight qualities of the assembled housing system, a sealant or a sealing member maybe used. In addition, in some embodiments, the lower part 100 and the upper part 200 may be welded together at welding points 140 that may serve as support structures as discussed above, to further increase (or improve) the mechanical stability of the assembled housing system.

FIG. 3B shows a schematic cross-sectional view of an (assembled) battery module housing system (e.g., a battery module housing) according to an embodiment of the invention. A cavity 300 is formed between the lower side of the bottom tile 260 of the upper part 200 and the upper side 100b (e.g., see FIGS. 2A and 2B) of the lower part 100. The cavity 300 is interrupted along the cross section by welding points 140, which the coolant may traverse (e.g., flow) around in a plane that is perpendicular to or substantially perpendicular to a plane of the cross section shown in FIG. 3B. An inlet through-hole 122a that extends through the lower part 100 provides access to the cavity 300 for coolant supply. The inlet through-hole 122a also extends through the inlet connector 120a arranged at (e.g., on) the lower side of the lower part 100, to provide a connection (e.g., a connection means) for a delivery ductwork (e.g., a hose or conduit) to supply coolant.

FIG. 3C shows a cross-sectional view of a battery module housing according to an embodiment of the invention, the cross-sectional view being perpendicular to the cross-sectional view of FIG. 3B. In the perspective of FIG. 3C, the cavity 300 formed between the lower side of the bottom tile 260 of the upper part 200 and the upper side of the lower part 100 is shown in more detail. The cavity 300 is interrupted, along the cross section shown, by the welding points 140. In addition to showing an access (e.g., an access channel) to the cavity 300 provided by the inlet connector 120a and the inlet through-hole 122a, a second access (e.g., a second access channel) to the cavity 300 is shown as an outlet connector 120b. The outlet connector 120b includes an outlet through-hole 122b that extends through the lower part 100, and that provides access to the cavity 300 for discharging coolant. The outlet through-hole 122b also extends through the outlet connector 120b arranged at (e.g., on) the lower side of the lower part 100, to provide a connection (e.g., a connection means) for a discharge ductwork (e.g., a hose or conduit) to discharge coolant.

As shown in more detail in FIGS. 3B and 3C, the inlet connector 120a having the inlet through-hole 122a, and the outlet connector 120b having the outlet through-hole 122b, may be formed integrally (e.g., unitarily formed) with the lower part 100, such that the lower part 100 may be manufactured in one piece (e.g., formed as a unitary component).

Accordingly, as described with reference to one or more example embodiments, the upper side 100b of the lower part 100 may include the depression 160 and the wall 162 surrounding the depression 160, such that the upper side 100b of the lower part 100 may be connected to the lower side of the bottom tile 260 via the wall to form a cavity 300 therebetween, but the present invention is not limited thereto. For example, in other embodiments, the lower side of the bottom tile 260 may include the depression 160 and/or the wall 162, or both the upper side 100b of the lower part 100 and the lower side of the bottom tile 260 may include a depression and/or a wall, such that the lower part 100 may be connected to the upper part 200 via the walls of the upper side 100b of the lower part 100 and the lower side of the bottom tile 260.

For example, in more detail, in an embodiment, a depression 160 may be formed on the upper side 100b of the lower part 100, and is confined (e.g., surrounded) by a wall 162 rising (e.g., extending) along an edge (e.g., a bezel) of the upper side 100b of the lower part 100, and the upper side 100b of the lower part 100 is connectable via the wall 162 to the lower side of the bottom tile 260. In other words, the upper side 100b of the lower part 100 may include a depression 160 and a wall 162 protruding from the upper side 100b of the lower part 100 and surrounding the depression 160, the wall 162 extending along an edge of the upper side 100b of the lower part 100 and configured to connect the upper side 100b of the lower part 100 to the lower side of the bottom tile 260.

In another example, according to an embodiment, a depression may be formed on the lower side of the bottom tile 260 and is confined (e.g., surrounded) by a wall rising (e.g., extending) along an edge (e.g., a bezel) of the lower side of the bottom tile 260, and the lower side of the bottom tile 260 is connectable via the wall to the upper side 100b of the lower part 100. In other words, the lower side of the bottom tile 260 may include a depression (e.g., 160) and a wall (e.g., 162) protruding from the lower side of the bottom tile 260 and surrounding the depression, the wall extending along an edge of the lower side of the bottom tile 260 and configured to connect the lower side of the bottom tile 260 to the upper side 100b of the lower part 100.

In still another example, according to an embodiment, a first depression may be formed on the upper side 100b of the lower part 100 and is confined (e.g., surrounded) by a first wall rising (e.g., extending) along the edge (e.g., the bezel) of the upper side 100b of the lower part 100. A second depression may be formed on the lower side of the bottom tile 260 and is confined (e.g., surrounded) by a second wall rising (e.g., extending) along the edge (e.g., the bezel) of the lower side of the bottom tile 260. The lower part 100 and the upper part 200 are connectable such that the first wall and the second wall rest on (e.g., contact) each other along their entire (e.g., complete) lengths. In other words, the upper side 100b of the lower part 100 may include a first depression (e.g., 160) and a first wall (e.g., 162) protruding from the upper side 100b of the lower part 100 and surrounding the first depression, the first wall extending along an edge of the upper side 100b of the lower part 100, the lower side of the bottom tile 260 may include a second depression and a second wall protruding from the lower side of the bottom tile 260 and surrounding the second depression, the second wall extending along an edge of the lower side of the bottom tile 260, and the lower part 100 and the bottom tile 260 are configured to be connected to each other via the first and second walls such that the first wall and the second wall contact each other along their entire lengths.

While one or more example embodiments of the present invention are described with reference to the attached drawings, it should be understood that embodiments described herein should be considered in a descriptive sense only and not for purposes of limitation. Accordingly, those having ordinary skill in the art will understand that various aspect and features of the present invention may be modified without departing from the spirit and scope of the present invention as defined in the following claims, and their equivalents.

DESCRIPTION OF SOME REFERENCE SYMBOLS z-axis/arrow reference direction and/or a reference orientation with the tip of the arrow indicating an upward direction
5 battery module, including a plurality of battery cells
10 soldered aluminum-plate
12a inlet hose
12b outlet hose
20 box for accommodating a battery module
22a cooling-connector for coolant supply
22b cooling-connector for coolant discharge
30 cavity
70 risings
100 lower part
100a lower side of lower part
100b upper side of lower part 120a inlet connector
120b outlet connector
122a inlet through-hole
122b outlet through-hole
130 guiding structure
140 welding point(s)
160 depression
162 wall
170 welding line
200 upper part
260 bottom tile of upper part
260a, 260b, 260c, 260d side tiles of upper part
300 cavity

What is claimed is:

1. A battery module housing system for cooling a battery module, the battery module housing system comprising:
   a lower part having a plate shape, an upper side, and a lower side opposite to the upper side of the lower part, the lower part comprising at least one coolant inlet and at least one coolant outlet that are integrally formed with the lower part; and
   an upper part configured to receive the battery module therein, the upper part having a tub shape and comprising a bottom tile having an upper side and a lower side opposite to the upper side of the bottom tile, the bottom tile being integrally formed with the upper part,
   wherein the upper side of the lower part is configured to be connected to the lower side of the bottom tile to define a cavity between the upper side of the lower part and the lower side of the bottom tile, the cavity defining a liquid-tight hollow interior that is accessible via the at least one coolant inlet and the at least one coolant outlet,
   wherein the at least one coolant inlet has an inlet through-hole penetrating through at least a surface of the upper side of the lower part,
   wherein: each coolant inlet comprises an inlet connector at the lower side of the lower part, the inlet connector being configured to be connected to a delivery ductwork to receive coolant from the delivery ductwork through the inlet through-hole and to provide the coolant to the upper side of the lower part;
   each coolant outlet has an outlet through-hole that extends through the lower part and comprises an outlet connector at the lower side of the lower part, the outlet connector being configured to be connected to a discharge ductwork to discharge coolant from the upper side of the lower part through the outlet through-hole to the discharge ductwork; and
   each of the inlet connector and the outlet connector has a pin shape at the lower side of the lower part corresponding to the inlet through-hole and the outlet through-hole, such that the inlet through-hole and the outlet through-hole further extend through the pin shape of the inlet connector and the outlet connector, respectively.

2. The battery module housing system according to claim 1, wherein the lower part is formed as a unitary component by injection molding, and/or the upper part is formed as a unitary component by injection molding.

3. The battery module housing system according to claim 1, wherein:
   the lower part comprises plastic or resin; and/or
   the upper part comprises plastic or resin, and an additive to increase heat conductivity of the upper part.

4. The battery module housing system according to claim 1, wherein the upper side of the lower part and the lower side of the bottom tile are congruent with each other; and
   wherein the cavity has a flat shape, and extends along the lower side of the bottom tile.

5. The battery module housing system according to claim 1,
   wherein the upper side of the lower part comprises a depression and a wall protruding from the upper side of the lower part and surrounding the depression, the wall extending along an edge of the upper side of the lower part and configured to connect the upper side of the lower part to the lower side of the bottom tile.

6. The battery module housing system according to claim 1,
   wherein the lower side of the bottom tile comprises a depression and a wall protruding from the lower side of the bottom tile and surrounding the depression, the wall extending along an edge of the lower side of the bottom tile and configured to connect the lower side of the bottom tile to the upper side of the lower part.

7. The battery module housing system according to claim 1, wherein:
   the upper side of the lower part comprises a first depression and a first wall protruding from the upper side of the lower part and surrounding the first depression, the first wall extending along an edge of the upper side of the lower part,
   the lower side of the bottom tile comprises a second depression and a second wall protruding from the lower side of the bottom tile and surrounding the second depression, the second wall extending along an edge of the lower side of the bottom tile, and
   the lower part and the bottom tile are configured to be connected to each other via the first and second walls such that the first wall and the second wall contact each other along their entire lengths.

8. The battery module housing system according to claim 1,
   wherein at least one of the upper side of the lower part and the lower side of the bottom tile comprises a guiding structure configured to direct coolant that is flowing into the cavity via the coolant inlet towards the coolant outlet along at least one path, and
   wherein the at least one path comprises a plurality of branches, a plurality of junctions, and/or a plurality of by-passes.

9. The battery module housing system according to claim 8, wherein the guiding structure is configured to prevent coolant that is flowing into the cavity via the coolant inlet from flowing out to the coolant outlet along a straight path.

10. The battery module housing system according to claim 1,
    wherein at least one of the upper side of the lower part and the lower side of the bottom tile comprises one or more risings configured to support the bottom tile when the battery module housing system is an assembled state to increase a mechanical stability of the battery module housing system when in the assembled state, and
    wherein the one or more risings are located at least at a center of the cavity of the battery module housing system when in the assembled state.

11. The battery module housing system according to claim 10, wherein the one or more risings extend from one side of the cavity to an opposite side of the cavity when the battery module housing system is in the assembled state.

12. The battery module housing system according to claim 1,
wherein each of the upper side of the lower part and the lower side of the bottom tile have a rectangular shape, and
wherein the upper part further comprises four side tiles extending from the upper side of the bottom tile to form an open box shape.

13. The battery module housing system according to claim 12, wherein the lower part and the upper part are configured to be connected to each other by welding, and
wherein the welding comprises plastic welding, mirror welding, friction welding, or high-frequency welding.

14. The battery module housing system according to claim 1,
wherein the lower part is connected to the upper part via welding to define the liquid-tight hollow cavity therebetween, and
wherein the welding comprises plastic welding, mirror welding, friction welding, or high-frequency welding.

15. A method for manufacturing a battery module housing system, the method comprising:
forming a lower part as a unitary component, the lower part having a plate shape, an upper side, and a lower side opposite to the upper side of the lower part, the lower part comprising at least one coolant inlet and at least one coolant outlet; and
forming an upper part as a unitary component, the upper part having a tub shape and configured to receive a battery module of the battery module housing system, and comprising a bottom tile having an upper side and a lower side opposite to the upper side of the bottom tile,
wherein the lower side of the bottom tile is configured to be connected to the upper side of the lower part to define a cavity between the upper side of the lower part and the lower side of the bottom tile, the cavity defining a liquid-tight hollow interior that is accessible via the at least one coolant inlet and the at least one coolant outlet, and
wherein the at least one coolant inlet has an inlet through-hole penetrating through at least a surface of the upper side of the lower part,
wherein: each coolant inlet comprises an inlet connector at the lower side of the lower part, the inlet connector being configured to be connected to a delivery ductwork to receive coolant from the delivery ductwork through the inlet through-hole and to provide the coolant to the upper side of the lower part;
each coolant outlet has an outlet through-hole that extends through the lower part and comprises an outlet connector at the lower side of the lower part, the outlet connector being configured to be connected to a discharge ductwork to discharge coolant from the upper side of the lower part through the outlet through-hole to the discharge ductwork; and
each of the inlet connector and the outlet connector has a pin shape at the lower side of the lower part corresponding to the inlet through-hole and the outlet through-hole, such that the inlet through-hole and the outlet through-hole further extend through the pin shape of the inlet connector and the outlet connector, respectively.

16. The method according to claim 15,
wherein the lower part is formed as the unitary component by injection molding; and/or
wherein the upper part is formed as the unitary component by injection molding.

17. The method of claim 15, further comprising:
welding the lower side of the bottom tile to the upper side of the lower part to define the cavity therebetween, the welding comprising plastic welding, mirror welding, friction welding, or high-frequency welding.

18. A method for assembling a battery module housing system comprising a lower part and an upper part, the lower part having a plate shape, an upper side, and a lower side opposite to the upper side of the lower part, the lower part comprising at least one coolant inlet and at least one coolant outlet, and the upper part having a tub shape and configured to receive a battery module of the battery module housing system, and comprising a bottom tile having an upper side and a lower side opposite to the upper side of the bottom tile, the method comprising:
connecting the lower part to the upper part to define a cavity between the upper side of the lower part and the lower side of the bottom tile of the upper part, the cavity defining a channel accessible via the at least one coolant inlet and the at least one coolant outlet of the lower part,
wherein the at least one coolant inlet has an inlet through-hole penetrating through at least a surface of the upper side of the lower part,
wherein: each coolant inlet comprises an inlet connector at the lower side of the lower part, the inlet connector being configured to be connected to a delivery ductwork to receive coolant from the delivery ductwork through the inlet through-hole and to provide the coolant to the upper side of the lower part;
each coolant outlet has an outlet through-hole that extends through the lower part and comprises an outlet connector at the lower side of the lower part, the outlet connector being configured to be connected to a discharge ductwork to discharge coolant from the upper side of the lower part through the outlet through-hole to the discharge ductwork; and
each of the inlet connector and the outlet connector has a pin shape at the lower side of the lower part corresponding to the inlet through-hole and the outlet through-hole, such that the inlet through-hole and the outlet through-hole further extend through the pin shape of the inlet connector and the outlet connector, respectively.

19. The method according to claim 18, further comprising:
welding the lower part to the upper part along a welding line along an edge of at least one of the upper side of the lower part and the lower side of the bottom tile of the upper part,
wherein the welding comprises plastic welding, mirror welding, friction welding, or high-frequency welding.

* * * * *